United States Patent [19]

Yun

[11] Patent Number: 5,638,484
[45] Date of Patent: Jun. 10, 1997

[54] TRACKING CONTROL METHOD DURING MULTIPLE SPEED REPRODUCTION OF A VIDEO TAPE AND APPARATUS THEREFOR

[75] Inventor: Soo-won Yun, Seoul, Rep. of Korea

[73] Assignee: Samsung Electronics Co., Ltd., Kyungki-do, Rep. of Korea

[21] Appl. No.: 495,751

[22] Filed: Jun. 26, 1995

[30] Foreign Application Priority Data

Jun. 24, 1994 [KR] Rep. of Korea ............... 94-14649

[51] Int. Cl.⁶ ............... H04N 15/94; H04N 5/78
[52] U.S. Cl. ............... 386/79; 386/80; 386/81; 386/88; 360/77.14
[58] Field of Search ............... 360/10.3, 10.2, 360/77.01, 77.14–77.16; 358/312, 338; 386/6–8, 14, 68, 79, 86–88, 16, 80, 81; H04N 9/79, 9/89, 5/95, 5/76, 5/92

[56] References Cited

U.S. PATENT DOCUMENTS

| | | | |
|---|---|---|---|
| 4,530,012 | 7/1985 | Kinjo | 358/327 |
| 4,558,382 | 12/1985 | Edakubo et al. | 360/77 |
| 4,568,986 | 2/1986 | Furuhata et al. | 360/10.2 |
| 4,658,309 | 4/1987 | Yasuda et al. | 360/77 |
| 4,814,900 | 3/1989 | Nemoto et al. | 360/10.2 |
| 4,868,692 | 9/1989 | Nakase et al. | 360/77.16 |
| 4,912,577 | 3/1990 | Kim | 360/77.13 |
| 4,977,469 | 12/1990 | Yokozawa | 360/77.01 |
| 5,251,079 | 10/1993 | Yamada et al. | 360/77.14 |

*Primary Examiner*—Andrew Faile
*Assistant Examiner*—Vincent F. Boccio
*Attorney, Agent, or Firm*—Sughrue, Mion, Zinn, Macpeak & Seas

[57] ABSTRACT

A tracking control apparatus having a multiple speed reproduction capability includes a unit for generating a tracking error signal and a microprocessor for controlling driving of a capstan motor, and controls transportation of a magnetic tape based on a comparison of a particular value of the tracking error signal with a value of a reference pilot signal generated according to a user key input, thereby reproducing a double speed reproduction picture of a high quality.

8 Claims, 5 Drawing Sheets

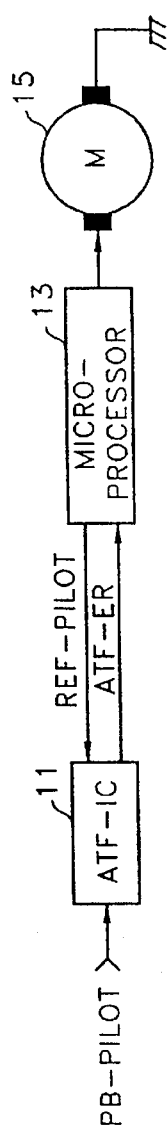
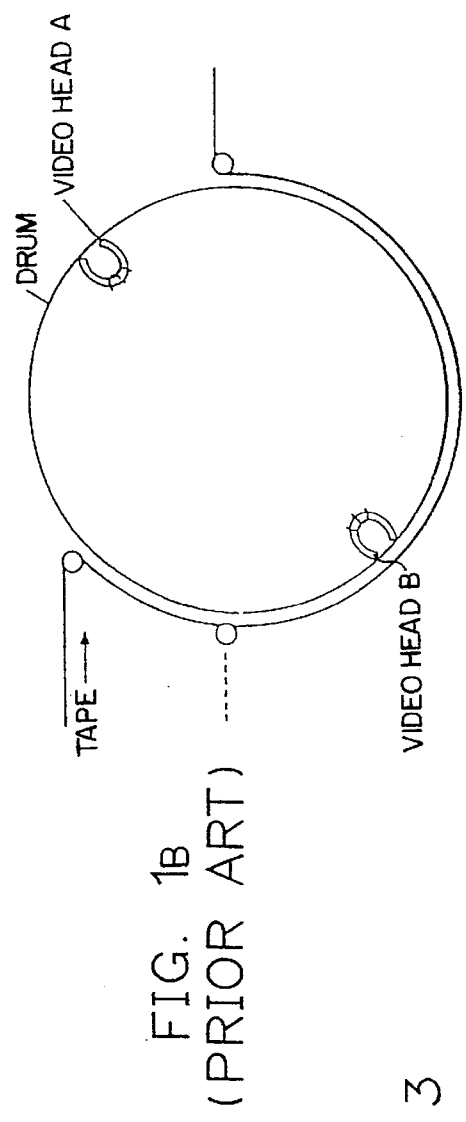
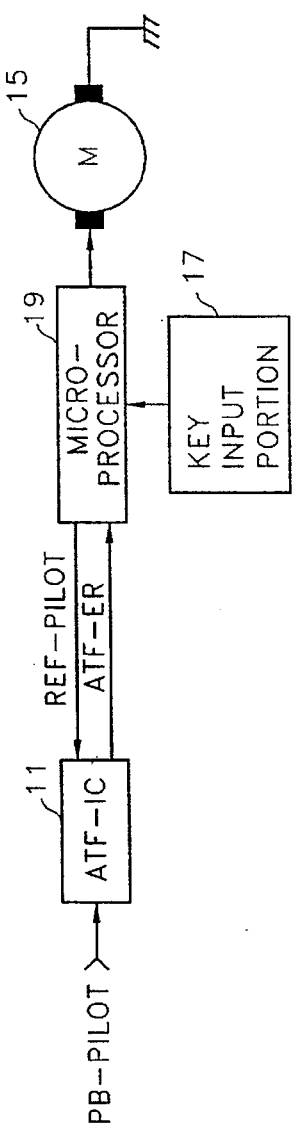

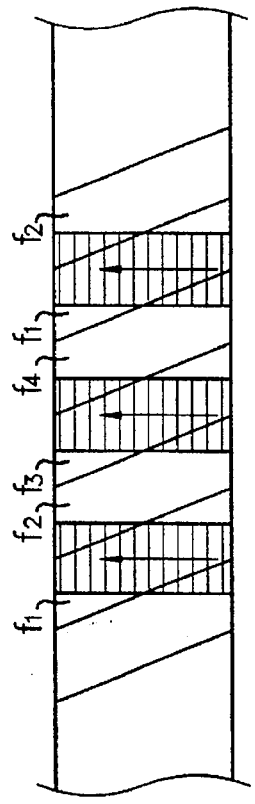
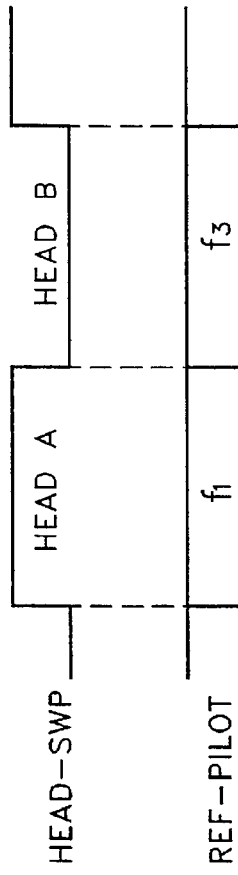
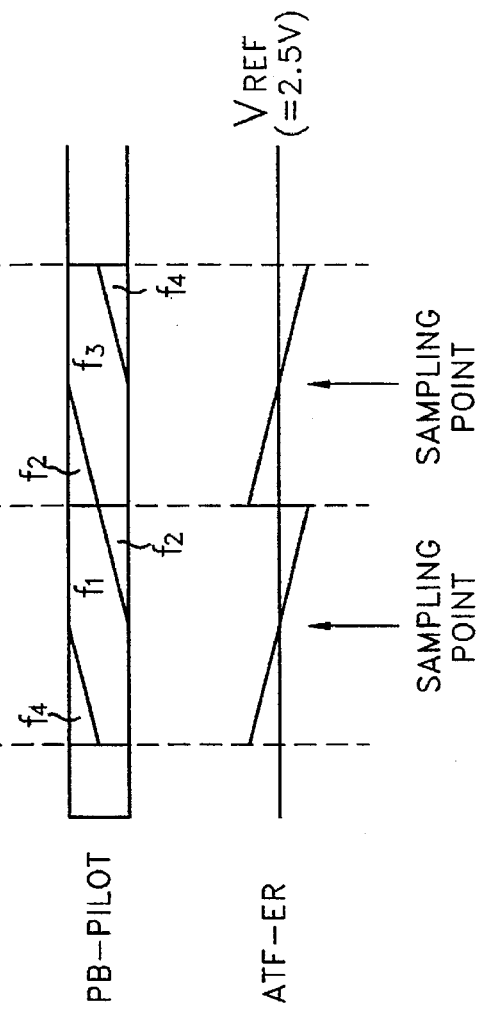
FIG. 2A (PRIOR ART)
FIG. 2B (PRIOR ART)
FIG. 2C (PRIOR ART)
FIG. 2D (PRIOR ART)
FIG. 2E (PRIOR ART)

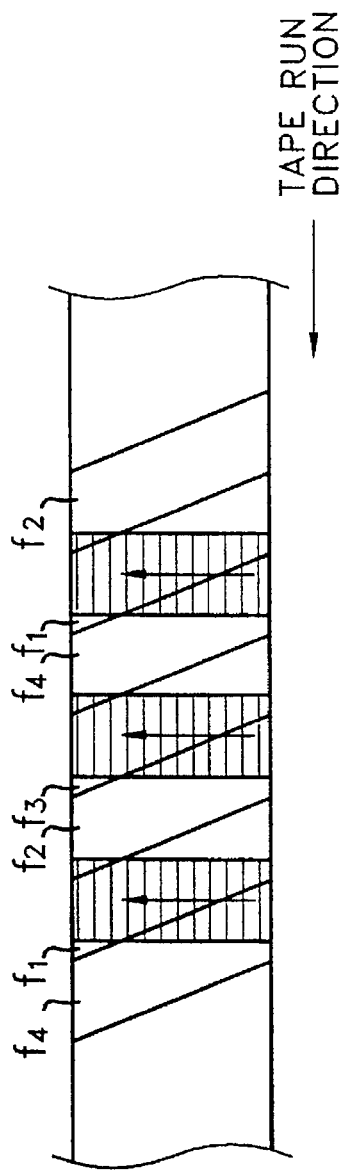
FIG.5A
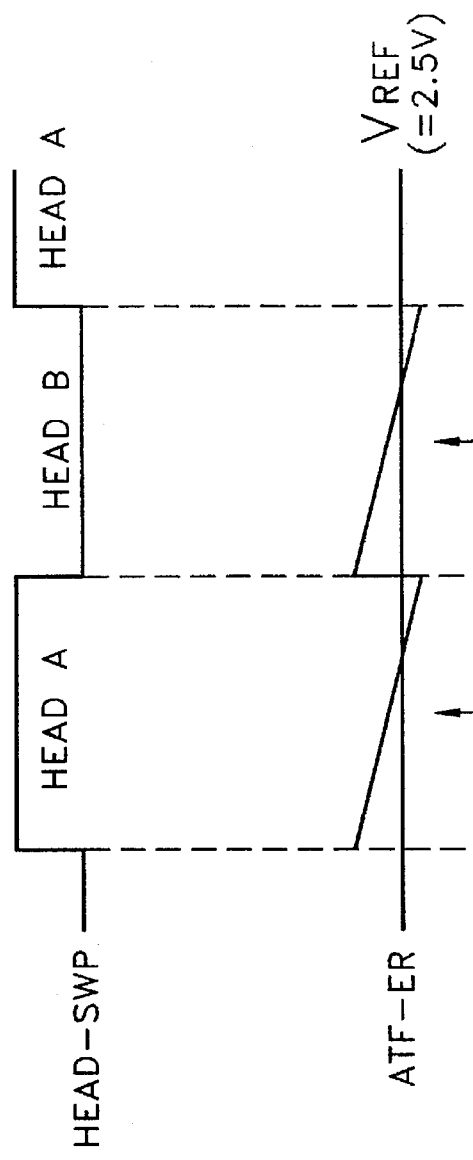
FIG.5B
FIG.5C

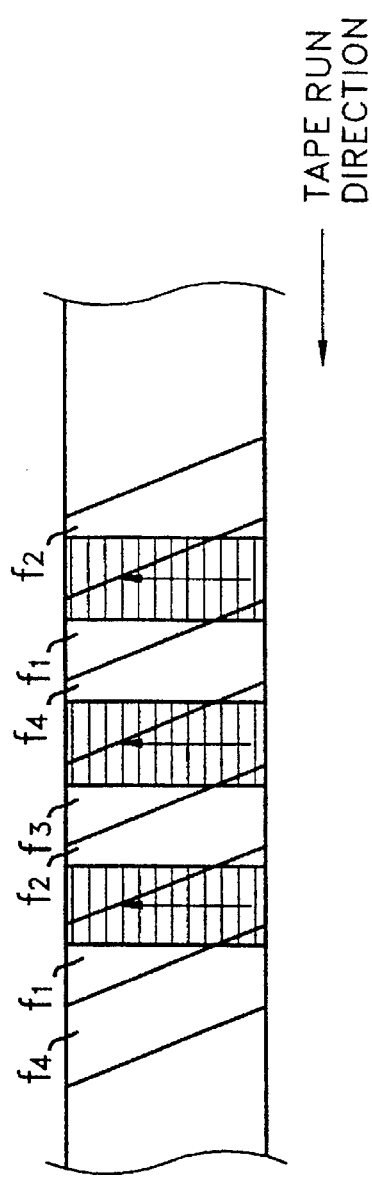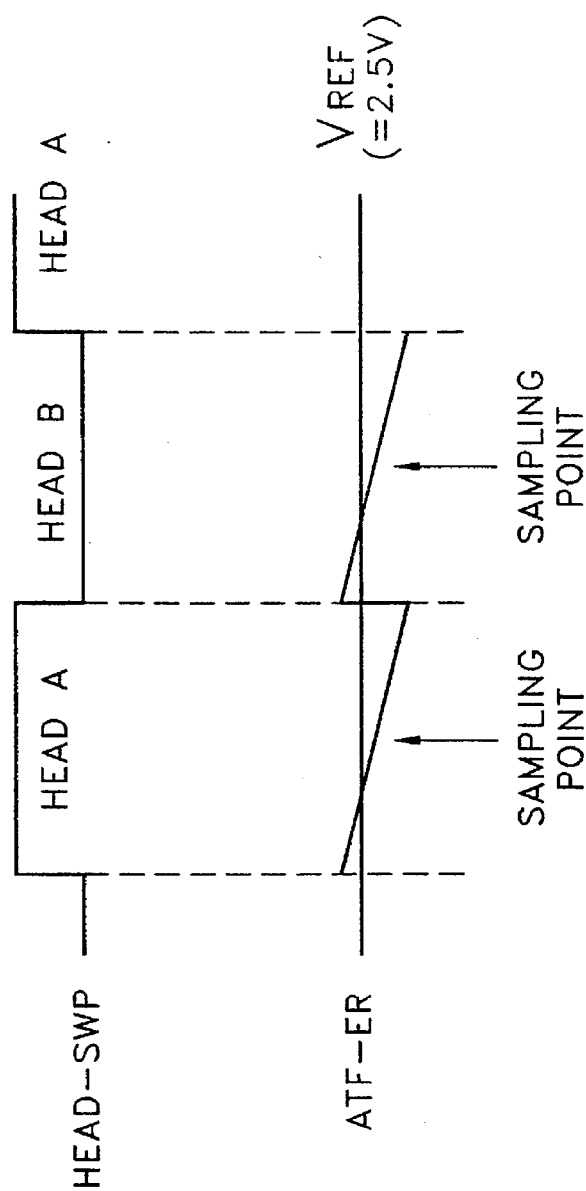
FIG.6A
FIG.6B
FIG.6C

TRACKING CONTROL METHOD DURING MULTIPLE SPEED REPRODUCTION OF A VIDEO TAPE AND APPARATUS THEREFOR

BACKGROUND OF THE INVENTION

1. Field of the Invention

The present invention relates to a multiple speed reproduction technology for use in an 8 mm-tape video cassette recorder and, more particularly, to a method for controlling tracking of a head for multiple speed reproduction. An apparatus controlling tracking of a head for multiple speed reproduction is also disclosed.

The instant application is based on Korean Patent Application No. 94-14649, which is incorporated herein by reference for all purposes.

2. Brief Discussion of Related Art

An apparatus for reproducing a video signal recorded on a magnetic tape in a speed different from a recording speed thereof is disclosed in U.S. Pat. No. 4,568,986 to Furuhata et al., which issued on Feb. 4, 1986, and is entitled "Variable Speed Playback Controller For A Video Tape Recorder". According to this reference, pilot signals having four different frequencies are periodically, repetitively and selectively recorded in sequential tracks on a magnetic tape, and local pilot signals having the same frequencies as those of the recorded pilot signals are sequentially generated in a predetermined sequence. The pilot signal reproduced from the magnetic tape is frequency-converted according to the local pilot signal. If the magnitude of a resultant differential frequency signal is detected, a servo control is performed to consistently maintain the frequency of the detected differential frequency signal. Technology using four kinds of pilot signals similar to those found in U.S. Pat. No. 4,568,986 is shown in FIG. 1A.

The tracking control apparatus of FIG. 1A is for an 8 mm-tape video cassette recorder, which adopts an automatic track following (ATF) method for controlling tracking of a head using four kinds of pilot signals recorded on the respective tracks of a magnetic tape. The pilot signals used in the FIG. 1A apparatus are recorded on sequential tracks periodically and repetitively as shown in FIG. 2A. Also, the pilot signals are overlapped with video information to be recorded on each track. The respective frequencies of the pilot signals are as follows: f1=102.5 kHz; f2=118.9 kHz; f3=165.2 kHz and f4=148.6 kHz. A frequency difference value between the pilot signals on adjacent tracks is approximately 16 kHz or 46.1 kHz, that is, $f_2-f_1=f_4-f_3=16$ kHz and $f_4-f_1=f_3-f_2=46$ kHz. An operation of the FIG. 1 apparatus when the 8 mm-tape video cassette recorder performs a double speed operation will be described below with reference to FIGS. 2A through 2E.

Two heads, shown in FIG. 1B, operate alternately according to a head switching signal HEAD-SWP of FIG. 2B. That is, during an interval when head switching signal HEAD-SWP has a high level pulse, head A operates, while during an interval when head switching signal HEAD-SWP has a low level pulse, head B operates. Head B is a multi-functional head which is usually used for double speed reproduction, and is located in a position substantially opposed to that of head A on a head drum as shown in FIG. 1B. Also, head B has the same azimuth characteristic as that of head A. The heads perform tracking of the magnetic tape at the normal double speed reproduction as shown in FIG. 2A. Thus, as shown in FIG. 2D, head A reads a playback pilot signal PB-PILOT having frequencies $f_4$, $f_1$ and $f_2$ and head B reads a playback pilot signal PB-PILOT having frequencies $f_2$, $f_3$ and $f_4$. The playback pilot signal PB-PILOT read from the magnetic tape by the heads is supplied to an ATF integrated circuit ATF-IC 11. Here, a microprocessor 13 generates a reference pilot signal REF-PILOT as shown in FIG. 2C. That is, microprocessor 13 generates a reference pilot signal REF-PILOT having frequency "$f_1$," when the frequency components of the playback pilot signal PB-PILOT are $f_4$, $f_1$ and $f_2$, while microprocessor 13 generates a reference pilot signal REF-PILOT of a frequency of "$f_3$" when the frequency components of the playback pilot signal PB-PILOT are $f_2$, $f_3$ and $f_4$.

The reference pilot signal has a reference level $V_{ref}$ of a constant voltage irrespective of a frequency of a signal during performance of the double speed reproduction. The reference level $V_{ref}$ is supplied to ATF integrated circuit 11. ATF integrated circuit 11 detects difference values between the frequency value of the reference pilot signal REF-PILOT and the frequency components contained in the playback pilot signal PB-PILOT, and generates a tracking error signal ATF-ER representing a quantitative ratio of the detected frequency difference values.

In more detail, ATF integrated circuit 11 detects frequency difference values of 46 kHz, 0 kHz and 16 kHz if the playback pilot signal PB-PILOT contains frequency components $f_4$, $f_1$ and $f_2$ and the reference pilot signal REF-PILOT has frequency $f_1$, and ATF integrated circuit 11 detects frequency difference values of 46 kHz, 0 kHz and 16 kHz if the playback pilot signal PB-PILOT contains frequency components $f_2$, $f_3$ and $f_4$ and the reference pilot signal REF-PILOT has frequency $f_3$. ATF integrated circuit 11 generates tracking error signal ATF-ER having a value smaller than predetermined reference level $V_{ref}$ when the detected frequency difference value is 16 kHz, and generates tracking error signal ATF-ER having a value larger than predetermined reference level $V_{ref}$ when the detected frequency difference value is 46 kHz. When playback pilot signal PB-PILOT read via head A has frequency components $f_4$ and $f_1$, ATF integrated circuit 11 generates tracking error signal ATF-ER having a value determined by a ratio between an amount of a signal having a frequency component $f_4$ and an amount of a signal having a frequency component $f_1$. The tracking error signal ATF-ER generated in ATF integrated circuit 11 is shown in FIG. 2E in which reference level $V_{ref}$ is 2.5 V.

Microprocessor 13 controls driving of a capstan motor 15 based on tracking error signal ATF-ER applied from ATF integrated circuit 11. In more detail, microprocessor 13 samples a particular value of tracking error signal ATF-ER at a sampling position shown in FIG. 2E when tracking error signal ATF-ER is applied thereto. Here, the sampling position shown in FIG. 2E is an intermediate position of each pulse of the head switching signal HEAD-SWP. When the sampled value has a value different from the reference level $V_{ref}$, microprocessor 13 controls driving of capstan motor 15 so that the detected value has the same value as that of reference level $V_{ref}$. By the operation of the FIG. 1A apparatus, the magnetic tape is precisely transported during double speed reproduction.

However, when the number of times which the magnetic tape has been used increases, the recording state of the magnetic tape deteriorates. When performance of a video cassette recorder used for a playback operation is lowered, an image signal reproduced from the magnetic tape and displayed on a screen picture may quality which is less than satisfactory.

3

SUMMARY OF THE INVENTION

Therefore, to solve the above problems, it is an object of the present invention to provide a method of displaying an image having a satisfactory quality by controlling tracking of a head according to a key input of a user who is watching a picture screen.

It is another object of the present invention to provide an apparatus for displaying an image of a satisfactory quality by controlling tracking of a head according to a key input of the user who is watching a picture screen.

To accomplish the above object of the present invention, there is provided a head tracking control method for multiple speed reproduction in a video cassette recorder in which pilot signals which are periodically and repetitively recorded on sequential tracks in a magnetic tape are used for a head tracking control, the head tracking control method comprising the steps of:

a) generating a reference pilot signal having a predetermined value;
b) generating a tracking error signal using the pilot signals reproduced from the magnetic tape and the reference pilot signal generated in step a, through the head tracking;
c) obtaining a tracking error value by sampling the tracking error signal generated in step b at a predetermined sampling position;
d) applying a track shift signal for shifting a head tracking position with respect to the magnetic tape which is transported in a speed for multiple speed reproduction, according to a key input of a user;
e) varying a value of the reference pilot signal according to the track shift signal applied in step d; and
f) controlling transportation of the magnetic tape so that the tracking error value obtained in step c is identical to the reference pilot signal varied in step e.

The other object of the present invention can be accomplished by providing a head tracking control apparatus for multiple speed reproduction in a video cassette recorder in which pilot signals which are periodically and repetitively recorded on sequential tracks in a magnetic tape are used for a head tracking control, the head tracking control apparatus comprising:

a capstan motor;
error signal generation means for generating a tracking error signal using the pilot signals reproduced from the magnetic tape and a reference pilot signal, through the magnetic tape tracking;
key input means for generating a track shift signal for shifting a head tracking position for multiple speed reproduction with respect to the magnetic tape, in response to a key input of a user;
a controller for generating the reference pilot signal used for generation of the tracking error signal and supplying the generated reference pilot signal to the error signal generation means, varying a value of the reference pilot signal for use in generation of the tracking error signal according to the track shift signal generated by the key input means, and controlling rotation of the capstan motor so that a tracking error value sampled at a predetermined sampling position from the tracking error signal supplied from the error signal generation means is the same as a value of the varied reference pilot signal.

BRIEF DESCRIPTION OF THE DRAWINGS

The preferred embodiments are described with reference to the drawings wherein:

FIG. 1A is a view showing an apparatus for a tracking control of a general 8 mm-tape video cassette recorder;

4

Figure 4:
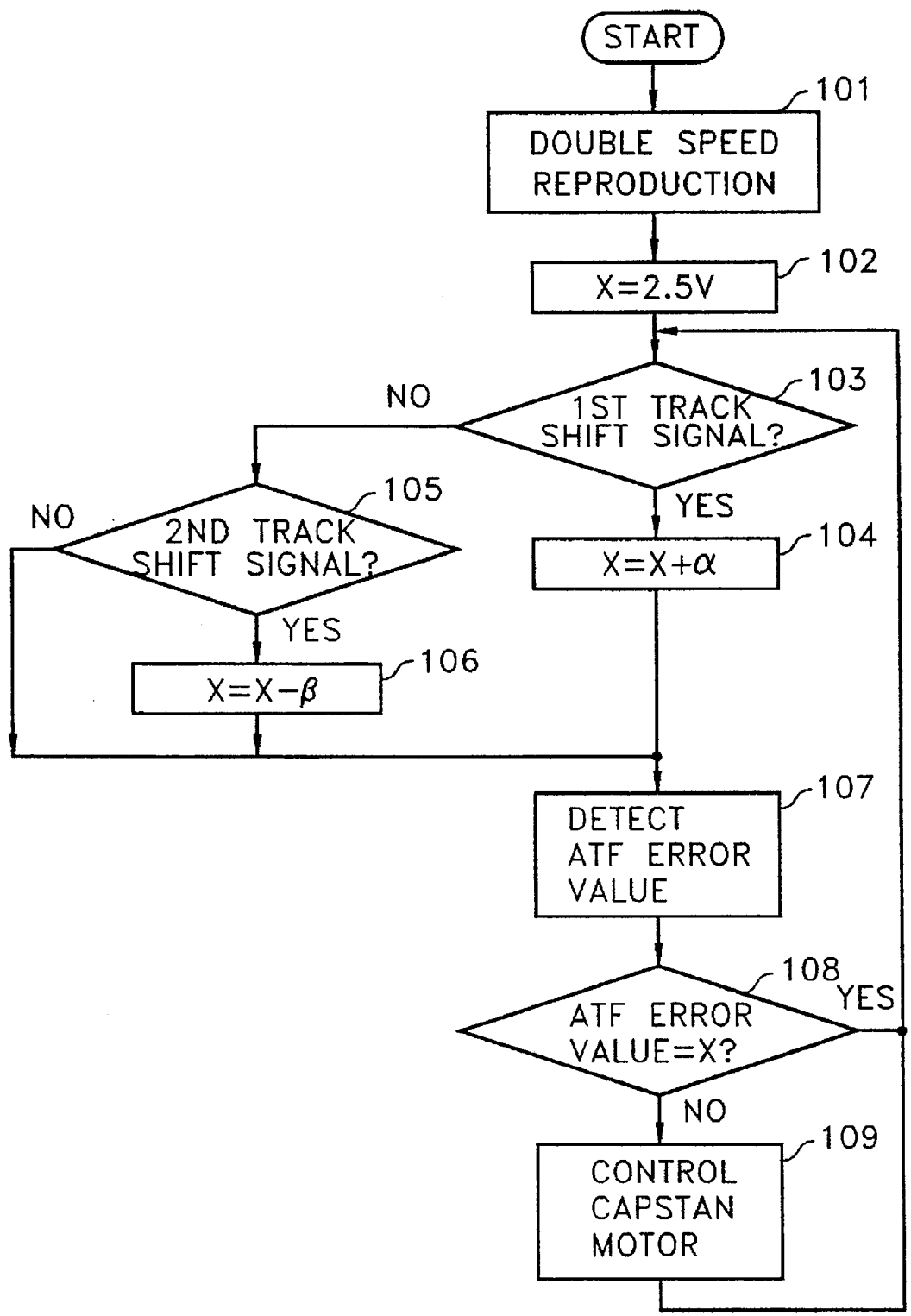

FIG. 1B is a conventional record/playback drum used in an 8 mm-tape video cassette recorder;

FIGS. 2A through 2E are views for explaining multiple speed reproduction of the FIG. 1A apparatus;

FIG. 3 is a view showing a tracking control apparatus according to a preferred embodiment of the present invention;

FIG. 4 is a flowchart diagram for explaining an operation of the FIG. 3 apparatus;

FIGS. 5A through 5C are views for explaining a case wherein a head tracking position is in a relatively time-leading position in the FIG. 3 apparatus; and FIGS. 6A through 6C are views for explaining a case wherein a head tracking position is in a relatively time-lagging position in the FIG. 3 apparatus.

DETAILED DESCRIPTION OF THE PREFERRED EMBODIMENT

A preferred embodiment of the present invention will be described below in more detail with reference to the accompanying drawings FIGS. 3 through 6C.

FIG. 3 is a view showing a tracking control apparatus according to a preferred embodiment of the present invention. FIG. 4 is a flowchart diagram for explaining an operation of the FIG. 3 apparatus. The FIG. 3 apparatus has a constitution in which a key input portion 17 is added to the FIG. 1A apparatus. The FIG. 3 apparatus also includes a modified microprocessor 19 which operates in response to a key input signal of a user via key input portion 17. FIG. 5A shows a case where heads perform tracking operations in a relatively time-leading tracking position compared to a tracking position of a normal double speed playback of FIG. 2A. FIG. 6A shows a case where heads perform tracking operations in a relatively time-lagging tracking position compared to a tracking position of a normal double speed playback of FIG. 2A.

Referring to FIG. 4, microprocessor 19 controls capstan motor 15 for a double speed playback in step 101. Microprocessor 19 also determines a reference level X of a reference pilot signal for generating a tracking error signal from the pilot signal reproduced from the magnetic tape as a voltage value of 2.5 V and outputs the determined reference level to ATF integrated circuit 11 in step 102. The heads operate according to head switching signal HEAD-SWP shown in FIG. 5B in the same manner as that described with reference to FIG. 2B. A video signal read out via a head which tracks on travelled magnetic tape is displayed via a display (not shown). Thus, the user can manipulate key input portion 17 based on the displayed video signal.

Microprocessor 19 judges whether a track shift signal supplied from key input portion 17 is a first track shift signal for enabling a head to track a time-leading track with respect to the current track in step 103. If it is judged as the first track shift signal in step 103, microprocessor 19 adds a value $\alpha$ corresponding to the first track shift signal to a predetermined reference level X to determine a new reference level $X+\alpha$ in step 104. When a tracking error signal ATF-ER generated in the same manner as that described with reference to the FIG. 1A apparatus is applied to microprocessor 19, microprocessor 19 samples a tracking error signal ATF-ER at a predetermined sampling position, that is, at an intermediate position of each pulse of head switching signal HEAD-SWP, to obtain a tracking error value in step 107. Microprocessor 19 judges whether the tracking error value obtained in step 107 is the same as reference level $X+\alpha$ in step 108. If it is not judged as the same value, microprocessor 19 controls driving of capstan motor 15 so that the tracking error value obtained by the sampling is the same value as the reference level X+α. On the other hand, if it is judged as the same value in step 108, microprocessor 19 performs the following step 103. By doing so, the tracking error value has a larger level (for example 2.6 V) than the reference level $V_{ref}$ of 2.5 V as shown in FIG. 5C. Also, the head tracking position expressed as an arrow in FIG. 5A has a relatively time-led position as can be seen from comparison with FIG. 2A.

On the other hand, if it is judged that the first track shift signal has not been applied in step 103, microprocessor 19 judges whether a second track shift signal is applied in step 105. If it is judged that the second track shift signal has been applied in step 105, microprocessor 19 subtracts a value β corresponding to the second track shift signal from the predetermined reference level X to determine a new reference level X–β in step 106. Microprocessor 19 samples tracking error signal ATF-ER at the predetermined sampling position to obtain a tracking error value in step 107. Microprocessor 19 judges whether the tracking error value obtained in step 107 is the same value as the reference level X–β in step 108. If it is not judged as the same value in step 108, microprocessor 19 controls driving of the capstan motor 15 so that the tracking error value obtained by the sampling is the same value as the reference level X–β. On the other hand, if it is judged as the same value in step 108, microprocessor 19 performs the following step 103. By doing so, the tracking error value has a smaller level (for example 2.4 V) than the reference level $V_{ref}$ of 2.5 V as shown in FIG. 6C. Also, the head tracking position expressed as an arrow in FIG. 6A has a relatively time-lagged position as can be seen from comparison with FIG. 2A.

As described above, the present invention enables the head tracking position to shift in response to the key input of a user who watches the picture screen in the automatic tracking following system using the pilot signals as in the 8 mm-tape video cassette recorder, thereby giving an effect of displaying a desired double speed playback picture.

While only certain embodiments of the invention have been specifically described herein, it will be apparent that numerous modifications may be made thereto without departing from the spirit and scope of the invention.

What is claimed is:

1. A head tracking control apparatus for multiple speed reproduction in a video cassette recorder, having a plurality of heads, in which pilot signals which are periodically and repetitively recorded on sequential tracks in a magnetic tape are used for a head tracking control, said head tracking control apparatus comprising:

a capstan motor;

error signal generation means for generating a tracking error signal using the pilot signals reproduced from the magnetic tape and a reference pilot signal, during magnetic tape tracking;

key input means for generating a track shift signal for shifting a head tracking position for multiple speed reproduction with respect to the magnetic tape, in response to a key input of a user;

a controller for generating a reference pilot signal used for generation of the tracking error signal and supplying the generated reference pilot signal to the error signal generation means, varying a value of the reference pilot signal used for generation of the tracking error signal according to the track shift signal generated by the key input means, and controlling rotation of the capstan motor so that a tracking error value sampled at a predetermined sampling position from the tracking error signal supplied from said error signal generation means is the same as a value of the varied reference pilot signal.

2. The head tracking control apparatus for multiple speed reproduction according to claim 1, further comprising means for generating head switching pulses for enabling selective operation of said plurality of heads, and wherein said predetermined sampling position corresponds to an intermediate position of each of said head switching pulses.

3. The head tracking control apparatus for multiple speed reproduction according to claim 1, wherein said controller increases the reference pilot signal value by a predetermined value if a first track shift signal for enabling a head to perform a tracking operation which is advanced in time with respect to a current tracking operation is applied from said key input means, and controls said capstan motor so that the head tracking position is shifted in a time-leading direction by a distance corresponding to a predetermined value.

4. The head tracking control apparatus for multiple speed reproduction according to claim 1, wherein said controller decreases the reference pilot signal value by a predetermined value if a second track shift signal for enabling a head to perform a tracking operation which is retarded in time with respect to a current tracking operation is applied from said key input means, and controls said capstan motor so that the head tracking position is shifted in a time-lagging direction by a distance corresponding to a predetermined value.

5. A head tracking control method for multiple speed reproduction in a video cassette recorder, having a plurality of heads, in which pilot signals which are periodically and repetitively recorded on sequential tracks in a magnetic tape are used for a head tracking control, said head tracking control method comprising the steps of:

a) generating a reference pilot signal having a predetermined value;

b) generating, during head tracking, a tracking error signal using the pilot signals reproduced from the magnetic tape and the reference pilot signal generated in step a;

c) obtaining a tracking error value by sampling the tracking error signal generated in step b at a predetermined sampling position;

d) applying a track shift signal for shifting a head tracking position with respect to the magnetic tape which is transported at a speed for multiple speed reproduction, according to a key input of a user;

e) varying a value of the reference pilot signal according to the track shift signal applied in step d; and f) controlling transportation of the magnetic tape so that the tracking error value obtained in step c is identical to the varied value of the reference pilot signal achieved in step e.

6. The head tracking control method for multiple speed reproduction according to claim 5, further comprising the step of generating head switching pulses for enabling selective operation of said plurality of heads, and wherein said predetermined sampling position corresponds to an intermediate position of each of said head switching pulses.

7. The head tracking control method for multiple speed reproduction according to claim 5, wherein when the track shift signal applied from step d is a signal for enabling one of said plurality of heads to track a track which time-leads a track currently being tracked, said step f comprises the steps of:

fa1) increasing a value of the reference pilot signal by a predetermined value; and fa2) controlling transportation of the magnetic tape so that the head tracking position is shifted in a time-leading direction by a distance corresponding to a predetermined value.

8. The head tracking control method for multiple speed reproduction according to claim 5, wherein when the track shift signal applied from step d is a signal for enabling one of the plurality of heads to track a track which time-lags a track currently being tracked, said step f comprises the steps of:

fb1) decreasing a value of the reference pilot signal by a predetermined value; and fb2) controlling transportation of the magnetic tape so that the head tracking position is shifted in a time-lag direction by a distance corresponding to a predetermined value.

* * * * *